(12) United States Patent
Pan

(10) Patent No.: US 12,190,635 B2
(45) Date of Patent: Jan. 7, 2025

(54) FACE SEARCH METHOD AND DEVICE, APPARATUS, AND COMPUTER-READABLE STORAGE MEDIUM

(71) Applicant: ZTE CORPORATION, Guangdong (CN)

(72) Inventor: Daohua Pan, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 369 days.

(21) Appl. No.: 17/635,417

(22) PCT Filed: Jul. 24, 2020

(86) PCT No.: PCT/CN2020/104519
§ 371 (c)(1),
(2) Date: Feb. 15, 2022

(87) PCT Pub. No.: WO2021/047305
PCT Pub. Date: Mar. 18, 2021

(65) Prior Publication Data
US 2022/0270403 A1 Aug. 25, 2022

(30) Foreign Application Priority Data
Sep. 10, 2019 (CN) .......................... 201910854591.1

(51) Int. Cl.
*G06V 40/16* (2022.01)
*G06F 16/51* (2019.01)

(52) U.S. Cl.
CPC ............ *G06V 40/169* (2022.01); *G06F 16/51* (2019.01); *G06V 40/172* (2022.01)

(58) Field of Classification Search
None
See application file for complete search history.

(56) References Cited

U.S. PATENT DOCUMENTS

| | | | |
|---|---|---|---|
| 2014/0086457 A1* | 3/2014 | Shah | G06V 40/174 382/118 |
| 2014/0270407 A1* | 9/2014 | Balakrishnan | G06F 16/587 382/118 |

(Continued)

FOREIGN PATENT DOCUMENTS

| | | |
|---|---|---|
| CN | 102968473 A | 3/2013 |
| CN | 110147455 A | 8/2019 |

OTHER PUBLICATIONS

Herve Jegou et al., Faiss: A library for efficient similarity search, Engineering at Meta, Mar. 29, 2017, pp. 1-7.

(Continued)

*Primary Examiner* — Vikkram Bali
(74) *Attorney, Agent, or Firm* — Vivacqua Crane, PLLC

(57) ABSTRACT

Disclosed are a face search method and device, an apparatus, and a computer-readable storage medium. According to the data volume of feature information in image feature databases currently to be searched, a user may flexibly select a technique of matching search feature information against feature information in a corresponding feature database, and/or select a technique of first performing initial matching for the search feature information against indices corresponding to feature information in a corresponding feature database, and then performing exact matching for the search feature information against feature information corresponding to a successfully matched index obtained from the initial matching.

16 Claims, 5 Drawing Sheets

(56) References Cited

U.S. PATENT DOCUMENTS

2015/0100577 A1* 4/2015 Hagiwara ............. G06F 16/587
    707/737
2021/0026882 A1* 1/2021 Chen .................... G06V 40/171

OTHER PUBLICATIONS

Extended European Search Report of European Patent Application No. 20862507.9 issued on May 12, 2023.
International Search Report of PCT Patent Application No. PCT/CN2020/104519 issued on Oct. 26, 2020.
European Patent Office. Communication pursuant to Article 94(3) EPC for EP Application No. 20862507.9, mailed May 13, 2024, pp. 1-9.
Pearl, R., "Healthy SQL: A Comprehensive Guide to Healthy SQL Server Performance," May 2015, pp. 1-397.

* cited by examiner

FACE SEARCH METHOD AND DEVICE, APPARATUS, AND COMPUTER-READABLE STORAGE MEDIUM

CROSS-REFERENCE TO RELATED APPLICATIONS

This application is on the basis of and claims the priority of Chinese Patent Application CN 201910854591.1 filed on Sep. 10, 2019, the entirety of which is incorporated herein by reference.

FIELD OF THE INVENTION

The present disclosure relates to the field of artificial intelligence, in particular to a face search method, device, apparatus and non-transitory computer readable storage medium.

BACKGROUND OF THE INVENTION

In the field of artificial intelligence, an application of face recognition technology is a common application scenario. With continuous evolution of the technology and accumulation of facial image feature data, a scale of data in a basic facial feature library gets larger and larger, which has reached the scale of tens of millions and even the scale of hundreds of millions. As a result, a face recognition search system may not only need to deal with a small scale of face search, but also a large scale of face search. A face search method in some cases is to, by using trained algorithms, extract image features from face images in a face image library, and form and save the image features as a picture feature library; then perform image feature extraction on a picture to be searched, and match this extracted image feature with the respective image features stored in the picture feature library one by one. The face search method in some cases is in a single form, and such a face search method has to match with all the image features in the picture feature library one by one. Therefore, it is difficult to meet performance requirement for matching in an application scenario with a large amount of face image feature data.

SUMMARY OF THE INVENTION

It is provided a face search method, a face search device, a face search apparatus, and a non-transitory computer-readable storage medium in order to solve problems at least to a certain extent that face search methods in some situations are prone to a single form and are not applicable to application scenarios having a large amount of face image feature data.

In view of these, an embodiment of the present disclosure provides a face search method, including: acquiring feature information to be searched of a face image to be searched and image feature databases to be searched; matching, when a first-type image feature database to be searched exits in the image feature databases to be searched, the feature information to be searched with respective feature information in the first-type image feature database to be searched; matching, when a second-type image feature database to be searched exists in the image feature databases to be searched, the feature information to be searched with feature index related to respective feature information in the second-type image feature database to be searched, acquiring target feature index that has been matched successfully, and then matching the feature information to be searched with respec- tive feature information related to the target feature index; and obtaining a face search result according to an obtained matching result.

An embodiment of the present disclosure also provides a face search device, including: a message processing module configured to acquire feature information of a face image to be searched and image feature databases to be searched; a first search processing module configured to, when a first-type image feature database to be searched exits in the image feature databases to be searched, match the feature information to be searched with respective feature information in the first-type image feature database to be searched; a second search processing module configured to, when a second-type image feature database to be searched exists in the image feature databases to be searched, match the feature information to be searched with feature index related to respective feature information in the second-type image feature database to be searched, acquire target feature index that has been matched successfully, and then match the feature information to be searched with respective feature information related to the target feature index; and a search management module configured to obtain a face search result according to a matching result of the first search processing module and/or the second search processing module.

An embodiment of the present disclosure further provides a face search apparatus, including a processor, a memory, and a communication bus; the communication bus is configured to connect the processor and the memory; the processor is configured to execute a computer program stored in the memory to implement the steps of the face search method as described above.

An embodiment of the present disclosure yet further provides a non-transitory computer-readable storage medium on which one or more computer programs are stored, the one or more computer programs are executable by one or more processors to implement the steps of the face search method as described above.

Other features and corresponding beneficial effects of the present disclosure are described in the latter part of the description, and it should be understood that at least part of the beneficial effects will become apparent from the content of the description of the present disclosure.

DETAILED DESCRIPTION OF THE EMBODIMENTS

Figure 1:
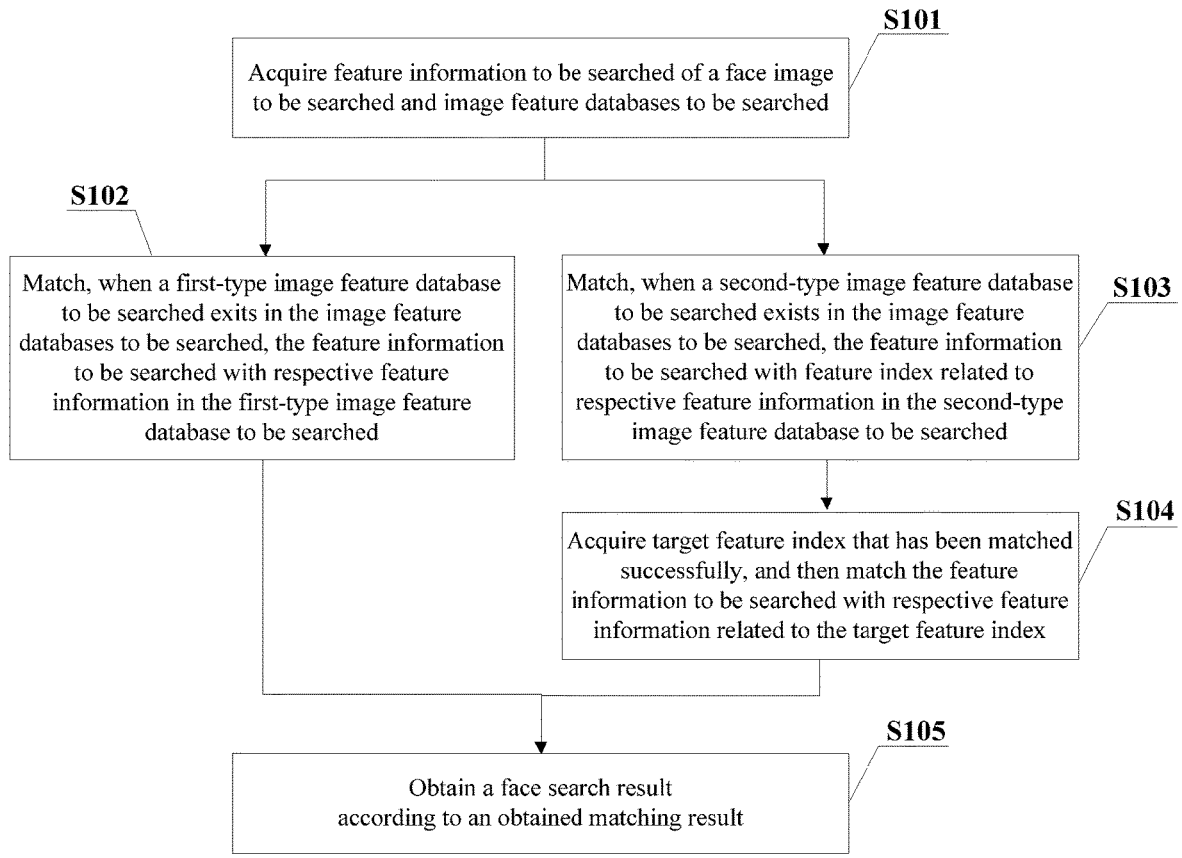
FIG. 1 is a schematic flowchart of a face search method according to Embodiment One of the present disclosure.

In order to make the objectives, technical solutions, and advantages of the present disclosure clearer, the embodiments of the present disclosure are further described in detail below through specific implementations in conjunction with the accompanying drawings. It should be understood that the specific embodiments described here are only used to explain the present disclosure, but not to construct limitation to the present disclosure.

Embodiment One

A face search method provided in this embodiment can flexibly select, according to data volumes of feature information in image feature databases to be searched currently, from an approach of directly matching feature information to be searched with feature information in a corresponding feature database and/or an approach of performing initial matching on feature information to be searched with index related to feature information in a corresponding feature database and then performing fine matching on the feature information to be searched and feature information related to the index that has succeed in the initial matching. As such, in addition to enriching face search approaches, for the case of a large amount of data in an image feature database to be searched, the feature information to be searched has been initially matched with the feature index having a smaller data volume and then is subjected to fine matching, so that a quantity of feature information that has to be matched one by one can be greatly reduced while ensuing search accuracy, and accuracy of face recognition can be ensured while enabling good adaptation to large data volume application scenarios.

In this embodiment, a first volume threshold for distinguishing a first-type image feature database and a second-type image feature database may be preset. With respect to an image feature database where a volume of currently stored feature information is greater than the preset first volume threshold among image feature databases within a system, it is determined that this image feature database is a second-type image feature database; with respect to an image feature database where a volume of currently stored feature information is less than or equal to the preset first volume threshold among the image feature databases in the system, it is determined this image feature database is a first-type image feature database. It should be understood that a specific value of the first volume threshold may be set flexibly in accordance with a specific application scenario. For example, it may be set to 1,000,000, 2,000,000, 5,000,000, etc., or alternatively it may be set to a scale of tens of millions or a scale of hundreds of millions. In this embodiment, the number of the first-type image feature databases and the number of the second-type image feature databases may be dynamically changed. For example, if it is detected that a quantity of feature index in a certain image feature database is switched from being less than or equal to the first volume threshold to being greater than a second volume threshold, then a type of the image feature database is switched from the first-type image feature database to the second-type image feature database.

In addition, it should be understood that the present embodiment is not limited to distinguishing the first-type image feature database and the second-type image feature database according to a volume of feature information currently stored in the image feature database, and classification of the first-type image feature database and the second-type image feature database may be performed by using other classification rules (for example, including but not limited to classification according to at least one of gender, region, age group, etc.) according to specific needs, which will not be described any further here.

In this embodiment, for respective feature information in the second-type image feature database, related feature index may be generated correspondingly, and the feature index related to respective feature information is also used for search and recognition of a face image. Moreover, in this embodiment, a data volume of the feature index is smaller than a data volume of the feature information so as to facilitate improvement of matching efficiency during initial search. It should be understood that, in this embodiment, one piece of feature information in the second-type image feature database may correspond to one piece of feature index, or multiple pieces of feature information may correspond to one piece of feature index in accordance with a specific application scenario (in this case, search efficiency during the initial search can be further improved). Content included in the feature index in the embodiment may be a subset of content included in the related feature information or other content having a mapping relationship therebetween. Moreover, in this embodiment, with respect to specific algorithms for generating the related feature index based on the feature information, there is no restriction as long as the above requirements can be met. In addition, in this embodiment, the generated feature index may be stored to be directly read at a next startup, thereby improving resource utilization and efficiency.

In this embodiment, maintenance of the image feature databases in the system may include, but is not limited to, the following process: by using a feature information extraction model or rule that has been set, feature information of face images (these face images may be a batch of collected face images, or may be face images dynamically added during use) is extracted from a basic picture library, and the extracted feature information is stored in a related image feature database as a basis for subsequent face search. In this embodiment, the image feature database may be, but is not limited to, a flat database or a relational database. In some application scenarios of this embodiment, all image feature databases in the system may be of the same type and subsequent maintenance and management approaches thereof may be applied in the same way, so that uniformity of the image feature databases in the system is ensured to provide better versatility and flexibility in following use.

Of course, in some application scenarios, at least part of the feature information in the image feature database may also be directly obtained from other systems without being extracted from the basic picture library.

It should be understood that in some application scenarios in this embodiment, the extracted feature information of the face images may include only image feature information of the face images. In such scenarios, during subsequent application process of face search and recognition, recognition may be performed only by matching image feature information of a face image to be searched with the image feature information in a related image feature database. In other application scenarios of this embodiment, the extracted feature information of the face images includes not only image feature information of the face images, but also description information of the face images. In these application scenarios, during the subsequent application process of face search and recognition, description information of a face image to be searched may also be matched with the description information of the face images in the related image feature database, that is, the description information at this time can also be used as a screening condition in the subsequent face search and recognition process so as to improve efficiency and accuracy of face recognition. In some application scenarios, said description information may also be used as a reference for reading, loading or managing in groups the image feature information in the image feature databases. The description information in this embodiment may include, but is not limited to, at least one of gender, age group, identity information (such as at least one of name, occupation, ID card, etc.), residence information, household registration information, etc. to which a face image belongs. These may be set flexibly according to specific needs.

Based on the above exemplary description, a face search method provided in this embodiment is shown in FIG. 1, which may include steps S101 to S105.

At step S101, feature information to be searched of a face image to be searched and image feature databases to be searched are acquired.

In the embodiment, a face search request may be received, which may directly include a face image to be searched. After the face search request is received, feature information corresponding to the face image included in the face search request is extracted as feature information to be searched. Of course, in other application scenarios, the face search request may also directly include feature information to be searched of a face image to be searched. It should be understood that the feature information to be searched in this embodiment may include only image feature information in some application scenarios, while it may include both image feature information and face image description information in other application scenarios.

In this embodiment, the face search request may include indication information of image feature databases to be searched, and the indication information of the image feature databases to be searched may include a range of the image feature databases to be searched or identification information of each image feature database to be searched.

At step S102, when a first-type image feature database to be searched exists in the image feature databases to be searched, the feature information to be searched is directly match with respective feature information in the first image feature database to be searched.

In some examples of this embodiment, before feature information to be searched of a face image to be searched and image feature databases to be searched are acquired, in order to improve search efficiency, in the case that a first-type image feature database currently exists in the system, feature information in the first-type image feature database currently existing in the system may be read into a memory so as to be directly called from the memory upon matching in the step S102.

In some application scenarios of this embodiment, in order to improve reading efficiency to meet a requirement of real-time processing, reading the feature information of the first-type image feature database currently existing in the system into the memory may include, but is not limited to, the following processes.

In some examples, the feature information in the first-type image feature database currently existing in the system is directly read into the memory through at least two independent threads, and the feature information read by different threads are different from each other, so that reading efficiency is improved.

In other examples, the feature information in the first-type image feature database currently existing in the system may be read into the memory through at least two independent threads, and the feature information read by different threads are different from each other only if at least one of the following is satisfied:

the number of the first-type image feature databases currently existing in the system is greater than or equal to two; and among the first-type image feature databases currently existing in the system, a volume of feature information in at least one first-type image feature database is greater than or equal to a preset second volume threshold (it should be understood that a specific value of the second volume threshold may also be set flexibly according to a specific application scenario, for example, may be set to 500,000, 1,000,000, 2,000,000, etc.).

In this embodiment, one independent thread may correspond to one first-type image feature database, or alternatively one first-type image feature database may correspond to a plurality of independent threads. This may be set flexibly according to practical needs.

Of course, in some scenarios where a high matching rate is not required, it is also possible to extract in real time, during execution of S102, related feature information from the corresponding image feature database for matching.

In some application scenarios, in order to improve matching efficiency, matching the feature information to be searched with respective feature information in the first image feature database may include the following process.

Matching the feature information to be searched with respective feature information in the first image feature database is performed in parallel by using at least two independent threads, and the feature information matched through different threads are different from each other. Thus, face image matching operation may be performed in parallel by using the at least two independent threads. The specific number of threads used, specific feature information matched through each thread and the like may be set flexibly according to a specific application scenario.

It should be understood that, in this embodiment, when there is no first-type image feature database to be searched in the image feature databases to be searched, execution of S102 is not necessary in this search process.

At step S103, when a second-type image feature database to be searched exists in the image feature databases to be searched, the feature information to be searched is matched with feature index related to respective feature information in the second-type image feature database to be searched.

In some examples of this embodiment, before feature information to be searched of a face image to be searched and image feature databases to be searched are acquired, in order to improve search efficiency, in the case that a second-type image feature database currently exists in the system, feature index related to respective feature information in the second-type image feature database currently existing in the system may be also read into a memory so as to be directly called from the memory upon matching in the step S103. In order to improve efficiency, in some application scenarios, at least two independent threads may also be used to read the feature index in the second-type image feature database currently existing in the system into the memory.

It should be understood that, in some examples of this embodiment, before feature information to be searched of a face image to be searched and image feature databases to be searched are acquired, in order to improve search efficiency, in the case that the first-type image feature database and the second-type image feature database both currently exist in the system, respective feature information of the currently existing first-type image feature database may be read into a memory, and feature index related to respective feature information of the currently existing second-type image feature database may be read into a memory.

Of course, in some scenarios where a high matching rate is not required, it is also possible to read, during execution of the step S103, the feature index corresponding to the second-type image feature database in real time, and then perform the matching.

At step S104, target feature index that has been successfully matched is acquired, and then the feature information to be searched is matched with respective feature information related to the target feature index.

Figure 2:
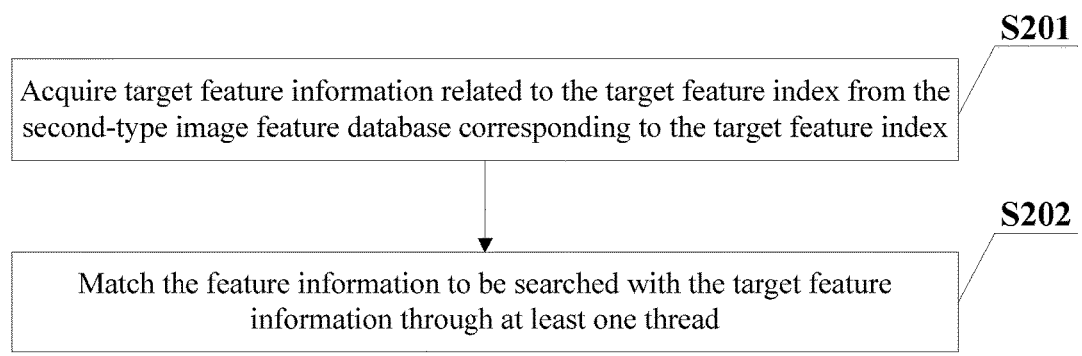
FIG. 2 is a schematic flowchart of a process of matching feature information to be searched with target feature information according to Embodiment One of the present disclosure.

For example, matching the feature information to be searched with respective feature information related to the target feature index is shown in FIG. 2, which may include steps S201 to S 202.

At step S201, target feature information related to the target feature index is acquired from the second-type image feature database corresponding to the target feature index.

At step S202, the feature information to be searched is matched with the target feature information through at least one thread.

In some application scenarios, in order to further improve matching efficiency, at least two independent threads may also be used to match the feature information to be searched with the target feature information in parallel. The target feature information matched through different threads are different from each other. The specific number of threads used, specific target feature information matched through each thread and the like may be set flexibly according to a specific application scenario.

It should be understood that, in this embodiment, when there is no second-type image feature database to be searched in the image feature databases to be searched, execution of the steps S103 and S104 is not necessary in this search process. Of course, in the case that the matched target feature index in the step S103 is null, execution of S104 is not necessary then.

At step S105, a face search result is obtained in accordance with an obtained matching result.

In the case that only the above step S102 is needed to be executed in a face search process, a face search result of this search is determined in accordance with a matching result of the step S102. In the case that only the above steps S103 and S104 are needed to be executed in a face search process, a face search result of this search is determined in accordance with a matching result of the step S104. In the case that the above step 102, as well as steps S103 and S104 are all executed in a face search process, a face search result of this search is determined in accordance with matching results of the steps S102 and S104.

It can be seen that the face search method provided in this embodiment can flexibly choose between, or employ in combination, two matching approaches as shown in step S102 and steps S103-S104 according to the data volume of the feature information in the image feature databases to be searched currently. As such, a quantity of feature information that needs to be matched one by one can be greatly reduced while ensuing search accuracy, and accuracy of face recognition can be ensured while enabling good adaptation to large data volume application scenarios.

Embodiment Two

Figure 3:
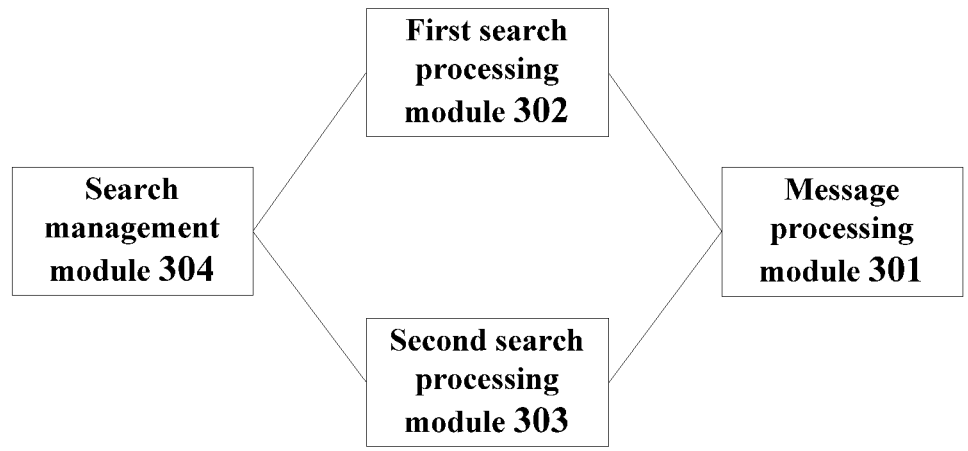
FIG. 3 is a schematic diagram of a structure of a face search device according to Embodiment Two of the present disclosure.

Provided in this embodiment is a face search device, which can be provided in various face search apparatuses. As shown in FIG. 3, it may include several modules.

A message processing module 301 is configured to acquire feature information to be searched of a face image to be searched and image feature databases to be searched.

A first search processing module 302 is configured to match, when a first-type image feature database to be searched exists in image feature databases to be searched, feature information to be searched with respective feature information in the first image feature database to be searched.

A second search processing module 303 is configured to match, when a second-type image feature database to be searched exists in the image feature databases to be searched, feature information to be searched with feature index related to respective feature information in the second-type image feature database to be searched, acquire target feature index that is successfully matched, and then match the feature information to be searched with respective feature information relate to the target feature index.

A search management module 304 is configured to obtain a face search result in accordance with a matching result of the first search processing module and/or the second search processing module.

In some examples of this embodiment, a first volume threshold for distinguishing a first-type image feature database and a second-type image feature database may be preset by the search management module 304. With respect to an image feature database where a volume of currently stored feature information is greater than the preset first volume threshold volume among image feature databases within a system, it is determined that this image feature database is a second-type image feature database; with respect to an image feature database where a volume of currently stored feature information is less than or equal to the preset first volume threshold among the image feature databases in the system, it is determined this image feature database is a first-type image feature database. It should be understood that a specific value of the first volume threshold may be set flexibly in accordance with a specific application scenario. In this embodiment, the number of the first-type image feature databases and the number of the second-type image feature databases may be dynamically changed. For example, if it is detected that a quantity of feature index in a certain image feature database is switched from being less than or equal to the first volume threshold to being greater than a second volume threshold, then a type of the image feature database is switched from the first-type image feature database to the second-type image feature database.

Figure 4:
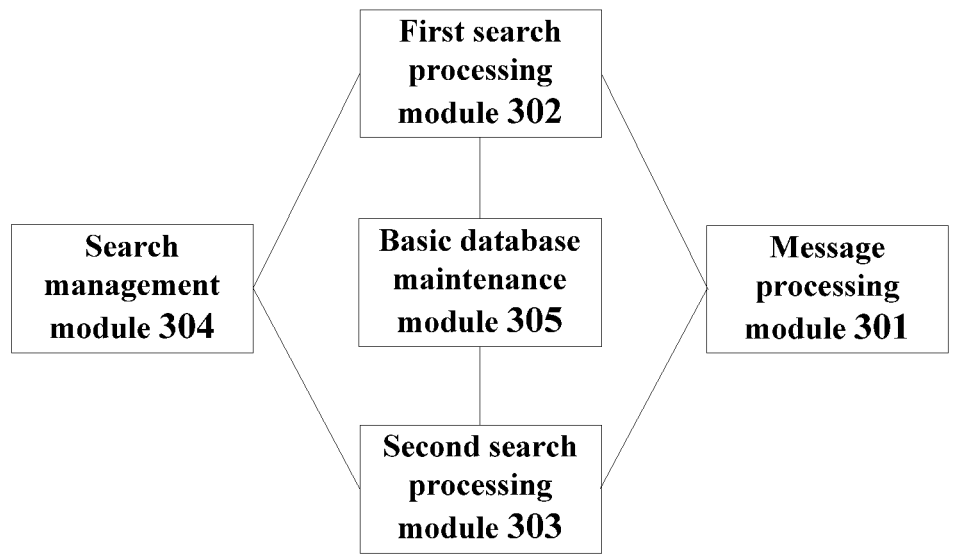
FIG. 4 is a schematic diagram of a structure of another face search device according to Embodiment Two of the present disclosure.

In some examples of this embodiment, referring to FIG. 4, the face search device may further include a basic database maintenance module 305 which is configured to maintain the image feature databases in the system. For example, the basic database maintenance module 305 may extract feature information of face images (these face images may be a batch of collected face images, or may be face images dynamically added during use) from a basic picture library according to a feature information extraction model or rule that has been set, and store the extracted feature information in a related image feature database as a basis for subsequent face search. In this embodiment, the image feature database may be, but is not limited to, a flat database or a relational database. In some application scenarios of this embodiment, all image feature databases in the system may be of the same type and subsequent maintenance and management approaches thereof may be applied in the same way, so that uniformity of the image feature databases in the system is ensured to provide better versatility and flexibility in following use. Of course, in some application scenarios, at least part of the feature information in the image feature database may also be directly obtained by the basic database maintenance module 305 from other systems without being extracted it from the basic picture library.

It should be understood that in some application scenarios in this embodiment, feature information of face images extracted by the basic database maintenance module 305 may include only image feature information of the face images. In such scenarios, during subsequent application process of face search and recognition, recognition may be performed only by matching image feature information of a face image to be searched with the image feature information in a related image feature database. In other application scenarios of this embodiment, the extracted feature information of the face images includes not only image feature information of the face images, but also description information of the face images. In these application scenarios, during the subsequent application process of face search and recognition, description information of a face image to be searched may also be matched with the description information of the face images in the related image feature database, that is, the description information at this time can also be used as a screening condition in the subsequent face search and recognition process so as to improve efficiency and accuracy of face recognition. In some application scenarios, said description information may also be used as a reference for reading, loading or managing in groups the image feature information in the image feature databases.

In this embodiment, the second search processing module 303 may further be configured to generate and store feature index related to respective feature information in a certain image feature database when it is detected that a volume of feature information stored in the image feature database in the system is greater than the preset first volume threshold. The feature index related to respective feature information is also used for search and recognition of a face image. Moreover, in this embodiment, a data volume of the feature index is smaller than a data volume of the feature information so as to facilitate improvement of matching efficiency during initial search. It should be understood that, in this embodiment, one piece of feature information in the second-type image feature database may correspond to one piece of feature index, or multiple pieces of feature information may correspond to one piece of feature index in accordance with a specific application scenario (in this case, search efficiency during the initial search can be further improved). Content included in the feature index in the embodiment may be a subset of content included in the related feature information or other content having a mapping relationship therebetween. Moreover, in this embodiment, with respect to specific algorithms for generating the related feature index based on the feature information, there is no restriction as long as the above requirements can be met. In addition, in this embodiment, the generated feature index may be stored to be directly read at a next startup, thereby improving resource utilization and efficiency.

In some examples of this embodiment, in order to improve search efficiency, the first search processing module 302 is further configured, in the case that a first-type image feature database currently exists in the system, to read feature information in the first-type image feature database currently existing in the system into a memory before the message processing module 301 acquires feature information to be searched of a face image to be searched and image feature databases to be searched. In some application scenarios, in order to improve reading efficiency to meet a requirement of real-time processing, the message processing module 301 may read the feature information in the first-type image feature database currently existing in the system into the memory directly through at least two independent threads, and the feature information read by different threads are different from each other, so that reading efficiency is improved. Of course, in some scenarios where a high matching rate is not required, it is also possible for the first search processing module 302 to extract, in real time, corresponding feature information from the related image feature database for matching only when it is necessary.

Additionally or alternatively, in other examples of this embodiment, in order to improve search efficiency, the second search processing module 303 may further be configured, in the case that a second-type image feature database currently exists in the system, to read feature information related to respective feature information in the second-type image feature database currently existing in the system into a memory before the message processing module 301 acquires feature information to be searched of a face image to be searched and image feature databases to be searched. In some application scenarios, in order to improve reading efficiency to meet a requirement of real-time processing, the second search processing module 303 may further read the feature index in the second-type image feature database currently existing in the system into the memory through at least two independent threads. Of course, in some scenarios where a high matching rate is not required, it is also possible for the second search processing module 303 to read, in real time, the feature index corresponding to the second-type image feature database only when it is necessary.

In addition, in order to further improve matching efficiency, in some application scenarios, the first search processing module 302 may match the feature information to be searched with the respective feature information in the first image feature database in parallel through, but not limited to, at least two independent threads, and the feature information matched through different threads are different from each other. Thus, face image matching operation may be performed in parallel by using the at least two independent threads. The specific number of threads used, specific feature information matched through each thread and the like may be set flexibly according to a specific application scenario.

In some application scenarios of this embodiment, in the process of matching the feature information to be searched with respective feature information related to the target feature index by the second search processing module 303, the second search processing module 303 may acquire target feature information related to the target feature index from the second-type image feature database corresponding to the target feature index, and then matches the feature information to be searched with the target feature information through at least one thread.

It should be understood that, in this embodiment, during a face search process, when there is no first-type image feature database to be searched in the image feature databases to be searched, the first search processing module 302 may not be called to execute the foregoing process; when there is no second-type image feature database to be searched in the image feature databases to be searched, the second search processing module 303 may not be called to execute the foregoing process. When there are both the first-type image feature database to be searched and the second-type image feature database in the image feature databases to be searched, the first search processing module 302 and the second search processing module 303 need to be called at the same time to execute the above processes, respectively.

In this embodiment, in the case that only the first search processing module 302 is called in a face search process, the search management module 304 obtains a face search result in accordance with a matching result obtained by the first search processing module 302. In the case that only the second search processing module 303 is called in a face search process, the search management module 304 obtains a face search result in accordance with a matching result obtained by the second search processing module 303. In the case that both the first search processing module 302 and the second search processing module 303 are called in a face search process, the search management module 304 obtains a face search result in accordance with the matching results obtained, respectively, by the first search processing module 302 and the second search processing module 303.

It can be seen that, by using the face search device provided in this embodiment, the first search processing module 302 and/or the second search processing module 303 may be called flexibly to execute corresponding face matching approaches according to data volumes of the feature information in the image feature databases to be searched currently. As such, not only search accuracy can be ensured, but also a quantity of feature information that has to be matched under a scenario with a large amount of data can be greatly reduced, and accuracy of face recognition can be ensured while enabling good adaptation to large data volume application scenarios.

Embodiment Three

For ease of understanding, this embodiment takes maintenance of the image feature databases and face search processes as examples for illustration below.

In this embodiment, the modules shown in Embodiment Two may be actuated and run according to their corresponding configuration. For example, the first volume threshold may be configured in accordance with current server performance, etc., such as 1,000,000. When a volume of feature information currently stored in a certain type of image feature database in the system is less than or equal to 1,000,000, it is a first-type image feature database. When a volume of feature information currently stored in a certain type of image feature database in the system is greater than 1,000,000, it is a second-type image feature database.

Figure 5:
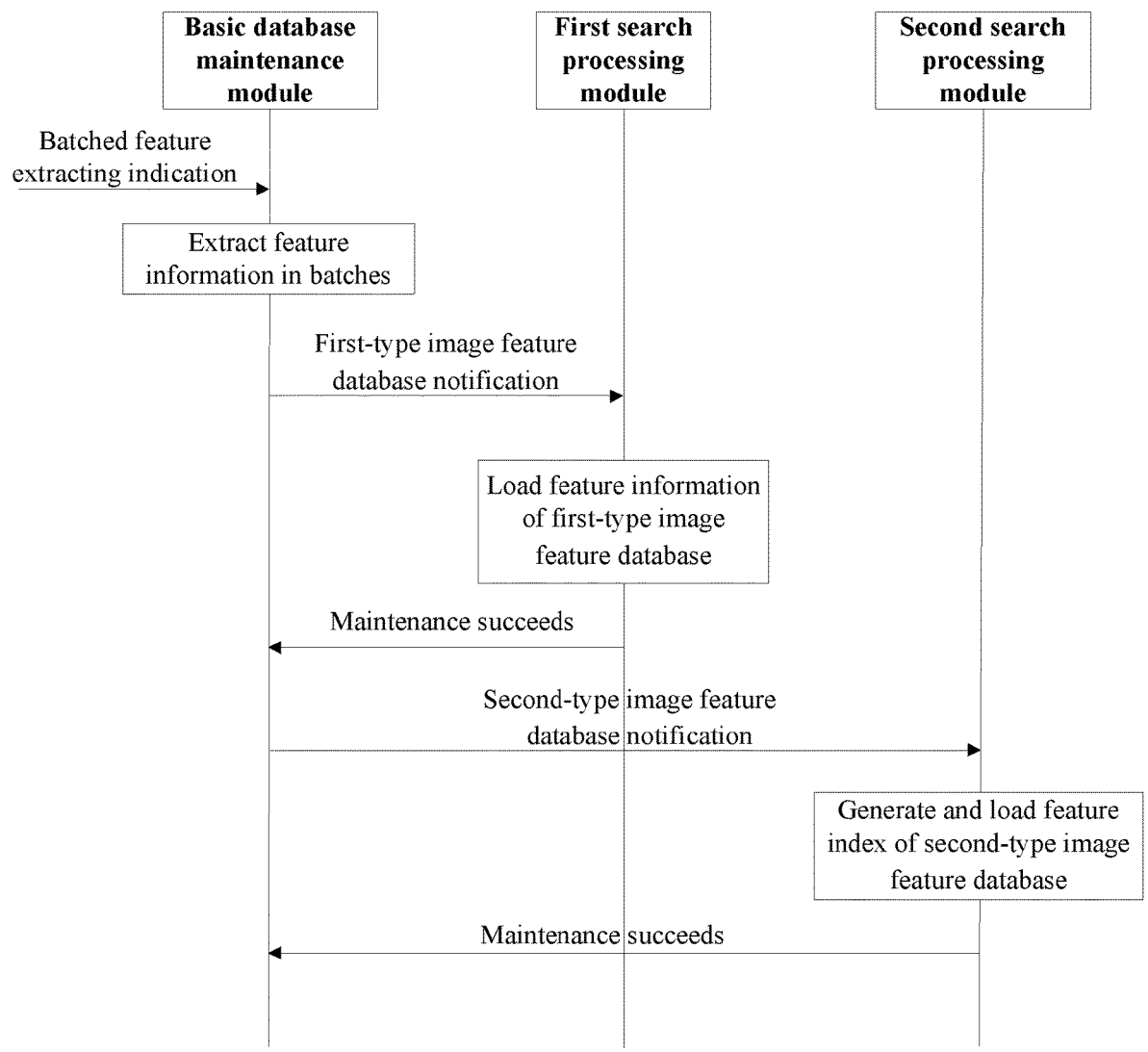
FIG. 5 is a schematic flowchart of a process of maintaining an image feature database according to Embodiment Three of the present disclosure.

Based on the above configuration, a process for maintaining of the image feature databases is shown in FIG. 5, which may include the following steps.

A basic database maintenance module performs batched extraction of feature on currently existing picture libraries. The extracted image feature information is stored in a disk in a prescribed flat format, and related description information is stored in a business database in tables. The storage pattern of the feature information can simultaneously meet format requirements of the first search processing module and the second search processing module. The basic database maintenance module extracts all the feature information in the picture libraries for subsequent searching use.

After the basic database maintenance module completes the batched feature extraction, it is determined to notify a corresponding module according to a volume of feature information stored in an image feature database. For example, when a volume of feature information stored in an image feature database is less than or equal to 1,000,000, the first search processing module is notified; when it is greater than 1,000,000, the second search processing module is notified then.

The first search processing module may store feature information in a currently existing first-type image feature database into a memory according to needs. In order to ensure a quick response to searching, the first search processing module may perform multi-threaded average maintenance and classified structural organization on these data. With respect to varied image feature databases, different threads may also be applied on one another for independent maintenance.

The second search processing module may generate related feature index for feature information in the currently existing second-type image feature database, and store the feature index for use at a next startup and load it into a memory (such as a central processing unit, CPU, or a graphic processing unit, GPU) at the same time, so that read-in from a basic feature database is not necessary. With respect to varied image feature databases, different threads may also be applied on one another for independent maintenance.

Figure 6:
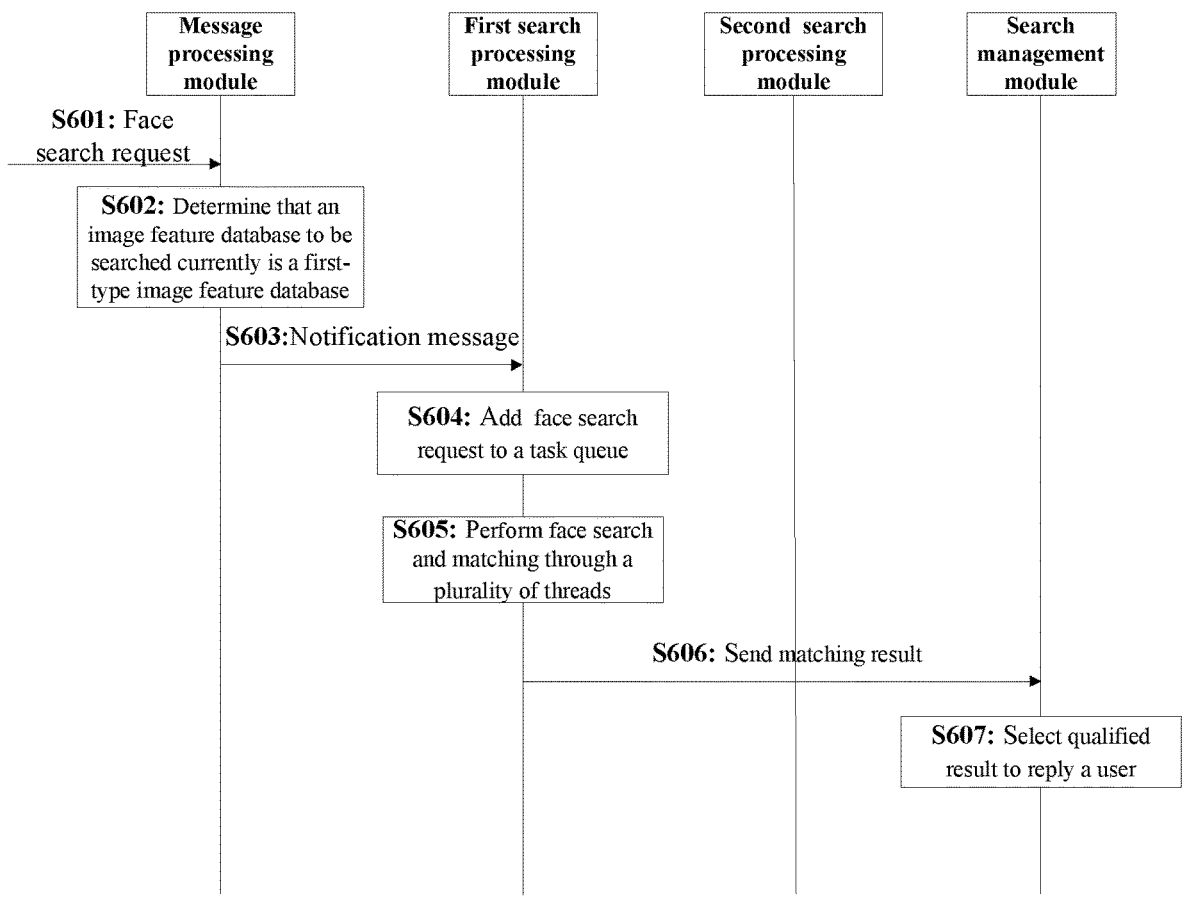
FIG. 6 is a schematic diagram of a face search process of a first search processing module according to Embodiment Three of the present disclosure.

An example of a face search process of the first search processing module is shown in FIG. 6, which may include steps S601 to S607.

At step S601, the message processing module receives a face search request so that feature information to be searched of a face image to be searched and image feature databases to be searched are acquired.

At step S602, the message processing module determines that an image feature database to be searched currently is a first-type image feature database.

At step S603, the message processing module sends a notification message to the first search processing module so as to send the feature information to be searched of the face image to be searched to the first search processing module.

At step S604, the first search processing module adds the face search request to a task queue according to the received notification message.

At step S605, the first search processing module performs face search and matching through a plurality of threads to respectively find out feature information that meets a condition.

At step S606, after the first search processing module retrieves results on the respective threads, it merges the results of the respective threads, picks out results that meet the condition, and sends a matching result to the search management module.

At step S607, the search management module selects the most qualified result to form a message according to the received information of the matching result, and replies it to a user.

Figure 7:
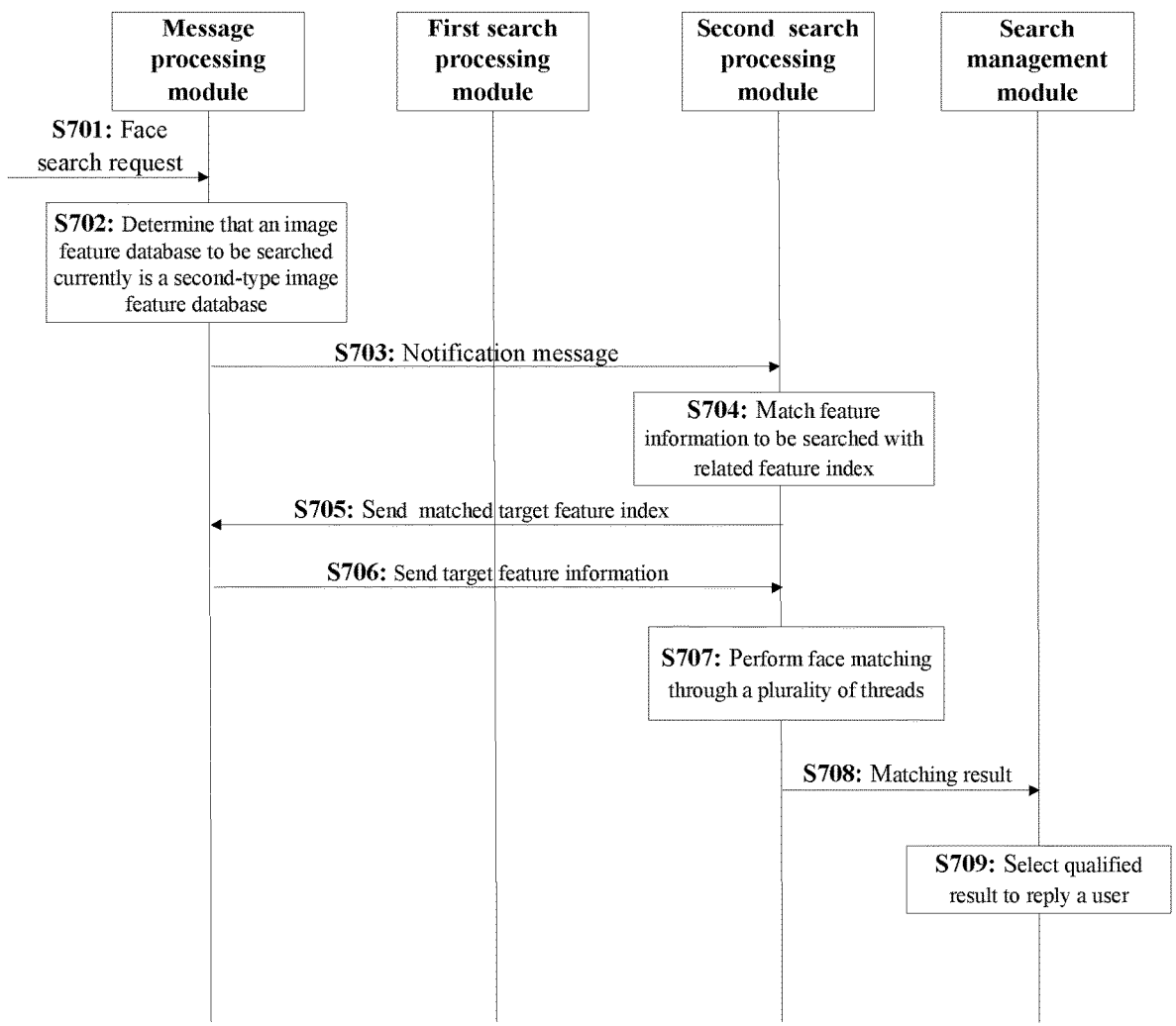
FIG. 7 is a schematic diagram of a face search process of a second search processing module according to Embodiment Three of the present disclosure.

An example of a face search process of the second search processing module is shown in FIG. 7, which may include steps S701 to S709.

At step S701, the message processing module receives a face search request so that feature information to be searched of a face image to be searched and image feature databases to be searched are acquired.

At step S702, the message processing module determines that an image feature database to be searched currently is a second-type image feature database.

At step S703, the message processing module sends a notification message to the second search processing module so as to send the feature information to be searched of the face image to be searched to the second search processing module.

At step S704, the second search processing module matches the feature information to be searched with feature index related to the corresponding second-type image feature database according to the received notification message. For example, the first 1000 feature index successfully matched with the best matching degree may be selected as target feature index.

At step S705, the second search processing module sends the matched target feature index to the message processing module.

At step S706, the message processing module extracts, from the corresponding second-type image feature database, and sends target feature information relate to the target feature index to the second search processing module.

At step S707, the second search processing module performs face search and matching through a plurality of threads, and respectively finds out feature information that meets a condition.

At step S708, after receiving results of the respective threads, the second search processing module merges the results of the respective threads, picks out results that meet the condition, and sends a matching result to the search management module.

At step S709, the search management module selects the most qualified result to form a message according to the received information of the matching result, and replies it to a user.

Embodiment Four

Figure 8:
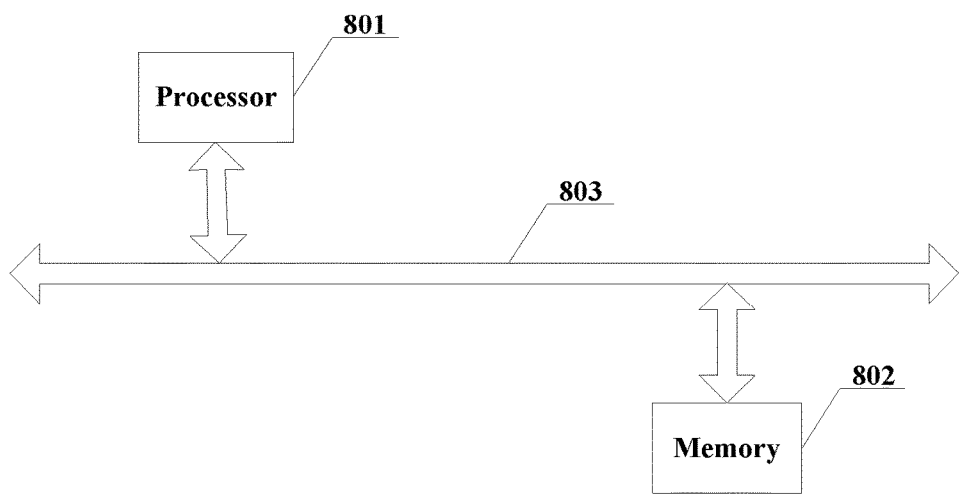
FIG. 8 is a schematic diagram of a structure of a face search apparatus according to Embodiment Four of the present disclosure.

This embodiment further provides a face search apparatus, which can be used as an apparatus of an offline or online face search system. As shown in FIG. 8, it includes a processor 801, a memory 802, and a communication bus 803.

The communication bus 803 is configured to implement a communication connection between the processor 801 and the memory 802.

In an example, the processor 801 may be configured to execute one or more computer programs stored in the memory 802 to implement the steps of the face search method in the above embodiments.

This embodiment further provides a computer-readable storage medium, which is included in a volatile or non-volatile, removable or non-removable media implemented in any method or technology for storing information (such as computer-readable instructions, data structures, computer program modules, or other data). The computer-readable storage media includes, but is not limited to, RAM (Random Access Memory), ROM (Read-Only Memory), EEPROM (Electrically Erasable Programmable read only memory), flash memory or other storage technology, CD-ROM (Compact Disc Read-Only Memory), digital versatile disk (DVD) or other optical disk storage, magnetic cassettes, magnetic tapes, disk storage or other magnetic storage devices, or any other medium that can be used to store desired information and that can be accessed by a computer.

In an example, the computer-readable storage medium in this embodiment may be configured to store one or more computer programs which are executable by one or more processors to implement the steps of the face search method as described above.

This embodiment further provides a computer program (or computer software) which can be distributed on a computer-readable medium and be executed by a computable device to implement at least one step of the face search method as illustrated in above embodiments; and in some cases, at least one step that is illustrated or described can be performed in a different order than that described in the above embodiments.

This embodiment further provides a computer program product, including a computer-readable device on which the computer program as illustrated above is stored. The computer-readable device in this embodiment may include the computer-readable storage medium as illustrated above.

According to the face search method, device, apparatus, and non-transitory computer-readable storage medium provided by the embodiments of the present disclosure, after the feature information of the face image to be searched and the image feature databases to be searched are acquired, when there is a first-type image feature database to be searched in the image feature databases to be searched, the feature information to be searched is matched with respective feature information in the first image feature database to be searched; when there is a second-type image feature database to be searched in the image feature databases to be searched, the feature information to be searched is matched with feature index related to respective feature information in the second-type image feature database to be searched, and target feature index that has been matched successfully is acquired, and then the feature information to be searched is matched with respective feature information related to the target feature index; a face search result is obtained according to the obtained matching result. Therefore, it can be seen that the face search method provided in this embodiment can flexibly select a specific matching approach according to a data volume of the feature information in the image feature database to be searched currently, thereby enriching approaches of face search; at the same time, for the second-type image feature database to be matched, initial matching of the feature information to be searched with feature index may be performed first, and then the feature information to be searched is matched with feature information related to the feature index that was successfully matched in the initial matching. As such, a quantity of feature information that needs to be matched one by one can be greatly reduced while ensuing search accuracy, and accuracy of face recognition can be ensured while enabling good adaptation to large data volume application scenarios.

Therefore, those skilled in the art should understand that all or some of the steps in the method disclosed above, the functional modules/units in the system and the device can be implemented as software (which may be implemented by computer program code executable by a computing device), firmware, hardware and their appropriate combination. In an implementation of hardware, division between functional modules/units mentioned in the above does not necessarily correspond to division of physical components; for example, a physical component may have multiple functions, or a function or step may be executed by several physical components in a cooperative manner. Some physical components or all physical components can be implemented as software executed by a processor, such as a central processing unit, a digital signal processor, or a microprocessor, or alternatively can be implemented as hardware, or an integrated circuit, such as an application specific integrated circuit.

In addition, as well known to those of ordinary skill in the art, communication media usually contains computer-readable instructions, data structures, computer program modules, or other data like in carrier waves or modulated data signals in other transmission mechanisms, and it may include any information delivery medium. Therefore, the present disclosure is not limited to any specific combination of hardware and software.

The foregoing is a further detailed description of the embodiments of the present disclosure in combination with specific implementations, and it cannot be considered that the specific implementations of the present disclosure are limited thereto. For those of ordinary skill in the technical field to which the present disclosure belongs, a number of simple deductions or substitutions can be made without departing from the concept of the present disclosure, which should be regarded as falling within the protection scope of the present disclosure.

What is claimed is:

1. A face search method, comprising:
    acquiring feature information to be searched of a face image to be searched and image feature databases to be searched;
    matching, in response to a first-type image feature database to be searched existing in the image feature databases to be searched, the feature information to be searched with respective feature information in the first-type image feature database to be searched, wherein the first-type image feature database is an image feature database where a volume of stored feature information is less than or equal to a preset first volume threshold;
    matching, in response to a second-type image feature database to be searched existing in the image feature databases to be searched, the feature information to be searched with feature index related to respective feature information in the second-type image feature database to be searched, acquiring target feature index that has been matched successfully, and then matching the feature information to be searched with respective feature information related to the target feature index, wherein the second-type image feature database is an image feature database where a volume of stored feature information is greater than the preset first volume threshold; wherein a data amount of the feature information in the second-type image feature database is greater than a data amount of related feature index of the feature information in the second-type image feature database; and
    obtaining a face search result according to an obtained matching result.

2. The face search method according to claim 1, wherein before acquiring feature information to be searched of a face image to be searched and image feature databases to be searched, the method further comprises at least one of:
    reading, when a first-type image feature database currently exists in a system, the feature information in the first-type image feature database into a memory;
    reading, when a second-type image feature database currently exists in the system, feature index related to respective feature information in the second-type image feature database into a memory.

3. The face search method according to claim 2, wherein, before acquiring feature information to be searched of a face image to be searched and image feature databases to be searched, and in a case of reading the feature information in the first-type image feature database currently existing in the system into a memory, the method comprises:
    reading the feature information in the first-type image feature database currently existing in the system into the memory through at least two independent threads and differing the feature information read by different threads from each other only if it is satisfied with at least one of:
    a quantity of the first-type image feature databases currently existing in the system is greater than or equal to two; and
    among the first-type image feature databases currently existing in the system, there is at least one first-type image feature database where a volume of feature information is greater than or equal to a preset second volume threshold.

4. The face search method according to claim 3, wherein matching the feature information to be searched with respective feature information in the first-type image feature database comprises:
    matching, by using at least two independent threads, the feature information to be searched with respective feature information in the first-type image feature database in parallel, and differing the feature information matched through different threads from each other.

5. The face search method according to claim 3, wherein matching the feature information to be searched with respective feature information related to the target feature index comprises:
    acquiring, from the second-type image feature database corresponding to the target feature index, target feature information related to the target feature index; and
    matching, by using at least one thread, the feature information to be searched with the target feature information.

6. The face search method according to claim 2, wherein matching the feature information to be searched with respective feature information in the first-type image feature database comprises:
    matching, by using at least two independent threads, the feature information to be searched with respective feature information in the first-type image feature database in parallel, and differing the feature information matched through different threads from each other.

7. The face search method according to claim 2, wherein matching the feature information to be searched with respective feature information related to the target feature index comprises:
    acquiring, from the second-type image feature database corresponding to the target feature index, target feature information related to the target feature index; and
    matching, by using at least one thread, the feature information to be searched with the target feature information.

8. The face search method according to claim 1, wherein matching the feature information to be searched with respective feature information in the first-type image feature database comprises:
    matching, by using at least two independent threads, the feature information to be searched with respective feature information in the first-type image feature database in parallel, and differing the feature information matched through different threads from each other.

9. The face search method according to claim 1, wherein matching the feature information to be searched with respective feature information related to the target feature index comprises:
- acquiring, from the second-type image feature database corresponding to the target feature index, target feature information related to the target feature index; and
- matching, by using at least one thread, the feature information to be searched with the target feature information.

10. The face search method according to claim 1, wherein matching the feature information to be searched with respective feature information in the first-type image feature database comprises:
- matching, by using at least two independent threads, the feature information to be searched with respective feature information in the first-type image feature database in parallel, and differing the feature information matched through different threads from each other.

11. The face search method according to claim 1, wherein matching the feature information to be searched with respective feature information related to the target feature index comprises:
- acquiring, from the second-type image feature database corresponding to the target feature index, target feature information related to the target feature index; and
- matching, by using at least one thread, the feature information to be searched with the target feature information.

12. A non-transitory computer-readable storage medium storing one or more computer programs thereon, wherein the one or more computer programs are executable by one or more processors to implement the steps of the face search method according to claim 1.

13. A face search device, comprising:
- a message processing module configured to acquire feature information of a face image to be searched and image feature databases to be searched;
- a first search processing module configured to, in response to a first-type image feature database to be searched existing in the image feature databases to be searched, match the feature information to be searched with respective feature information in the first-type image feature database to be searched, wherein the first-type image feature database is an image feature database where a volume of stored feature information is less than or equal to a preset first volume threshold;
- a second search processing module configured to, in response to a second-type image feature database to be searched existing in the image feature databases to be searched, match the feature information to be searched with feature index related to respective feature information in the second-type image feature database to be searched, acquire target feature index that has been matched successfully, and then match the feature information to be searched with respective feature information related to the target feature index, wherein the second-type image feature database is an image feature database where a volume of stored feature information is greater than the preset first volume threshold; wherein a data amount of the feature information in the second-type image feature database is greater than a data amount of related feature index of the feature information in the second-type image feature database; and
- a search management module configured to obtain a face search result according to a matching result of the first search processing module and/or the second search processing module.

14. The face search device according to claim 13, further comprising a basic database maintenance module configured to extract and store feature information of basic pictures in a corresponding image feature database,
- wherein the second search processing module is further configured to, when it is detected that a volume of feature information stored in a certain image feature database in a system is greater than the preset first volume threshold, generate and store feature index related to respective feature information in the image feature database.

15. The face search device according to claim 14, wherein the first search processing module is further configured to, before the message processing module acquires feature information to be searched of a face image to be searched and image feature databases to be searched, execute at least one of:
- reading, when a first-type image feature database currently exists in the system, the feature information in the first-type image feature database into a memory;
- reading, when a second-type image feature database currently exists in the system, feature index related to respective feature information in the second-type image feature database into a memory.

16. The face search device according to claim 13, wherein the first search processing module is further configured to, before the message processing module acquires feature information to be searched of a face image to be searched and image feature databases to be searched, execute at least one of:
- reading, when a first-type image feature database currently exists in the system, the feature information in the first-type image feature database into a memory;
- reading, when a second-type image feature database currently exists in the system, feature index related to respective feature information in the second-type image feature database into a memory.

* * * * *